(12) United States Patent
Ebdon et al.

(10) Patent No.: US 9,792,166 B2
(45) Date of Patent: Oct. 17, 2017

(54) SYSTEM AND METHOD FOR MANAGING AN OBJECT CACHE

(75) Inventors: Deren George Ebdon, Carollton, TX (US); Robert W. Peterson, Plano, TX (US)

(73) Assignee: Open Invention Network, LLC, Durham, NC (US)

( * ) Notice: Subject to any disclaimer, the term of this patent is extended or adjusted under 35 U.S.C. 154(b) by 277 days.

(21) Appl. No.: 13/289,746

(22) Filed: Nov. 4, 2011

(65) Prior Publication Data

US 2013/0117405 A1    May 9, 2013

(51) Int. Cl.
*G06F 15/173* (2006.01)
*G06F 9/54* (2006.01)

(52) U.S. Cl.
CPC ..................... *G06F 9/548* (2013.01)

(58) Field of Classification Search
USPC ......................................................... 709/224
See application file for complete search history.

(56) References Cited

U.S. PATENT DOCUMENTS

| | | | |
|---|---|---|---|
| 6,085,198 A * | 7/2000 | Skinner et al. | |
| 6,128,701 A * | 10/2000 | Malcolm et al. | 711/133 |
| 6,393,415 B1 * | 5/2002 | Getchius et al. | |
| 6,598,058 B2 * | 7/2003 | Bird et al. | |
| 6,697,849 B1 * | 2/2004 | Carlson | 709/219 |
| 6,721,740 B1 * | 4/2004 | Skinner et al. | |
| 6,757,708 B1 * | 6/2004 | Craig | G06F 17/30902 707/999.01 |
| 7,209,929 B2 * | 4/2007 | Dominguez et al. | 707/781 |
| 7,376,790 B2 * | 5/2008 | Lango et al. | 711/126 |
| 7,480,657 B1 * | 1/2009 | Glovin et al. | |
| 7,734,747 B2 * | 6/2010 | Murphy et al. | 709/223 |
| 2001/0021963 A1 * | 9/2001 | Cypher | 711/146 |
| 2002/0092012 A1 * | 7/2002 | Shah | 717/170 |
| 2003/0204645 A1 * | 10/2003 | Sharma et al. | 709/328 |
| 2005/0165828 A1 * | 7/2005 | Lango et al. | 707/102 |
| 2006/0101444 A1 * | 5/2006 | Pepin et al. | 717/165 |
| 2007/0288510 A1 * | 12/2007 | Dominguez et al. | 707/103 R |
| 2009/0300225 A1 * | 12/2009 | Williamson et al. | 710/8 |
| 2010/0125602 A1 * | 5/2010 | Eisinger | G06F 21/6227 707/781 |
| 2011/0289479 A1 * | 11/2011 | Pletter et al. | 717/122 |
| 2012/0144405 A1 * | 6/2012 | Kalagananam et al. | 719/316 |
| 2013/0007027 A1 * | 1/2013 | Hazel | G06F 17/30569 707/756 |

* cited by examiner

*Primary Examiner* — Karen Tang
(74) *Attorney, Agent, or Firm* — Haynes and Boone, LLP

(57) ABSTRACT

In order to optimize efficiency of serialization, a serialization cache is maintained at an object server. The serialization cache is maintained in conjunction with an object cache and stores serialized forms of objects cached within the object cache. When an object is to be sent from the server to the client, a serialization module determines if a serialized form of the object is stored in the serialization cache. If the object is already serialized within the serialization cache, the serialized form is retrieved and provided to the client. Otherwise, the object is serialized, the object is cached in the object cache and the serialized form of the object is cached in the serialization cache.

17 Claims, 7 Drawing Sheets

SYSTEM AND METHOD FOR MANAGING AN OBJECT CACHE

FIELD OF THE INVENTION

This disclosure relates to methods of managing the serialized forms of cached objects.

BACKGROUND OF THE INVENTION

Existing serialization solutions typically seek to optimize the effort of serializing an object (for a given protocol) by writing the serialization logic in the most efficient manner possible. Some solutions attempt to avoid redundant serialization by caching complete serialized object graphs, then transmitting these cached object graphs enclosed (opaquely) within another serialization stream. Serialization protocols such as Java object serialization expect the user to provide hand-coded serialization if they wish to optimize.

Increasing the efficiency of a serialization mechanism will always reach an effective limit for a given hardware/software platform, and does not save the effort of repeating serialization for unchanged (or largely unchanged) objects. Enclosing a complete serialization within another serialization stream does not account for references from the outer scope. Hand-coded serialization is tedious for the developer, is error prone, and does not save redundant work.

What is a required is an improved method and system for managing the serialized form of cached objects.

SUMMARY OF THE INVENTION

In order to optimize efficiency of serialization, a serialization cache is maintained at an object server. The serialization cache is maintained in conjunction with an object cache and stores serialized forms of objects cached within the object cache. When an object is to be sent from the server to the client, a serialization module determines if a serialized form of the object is stored in the serialization cache. If the object is already serialized within the serialization cache, the serialized form is retrieved and provided to the client. Otherwise, the object is serialized, the object is cached in the object cache and the serialized form of the object is cached in the serialization cache.

In one aspect of the disclosure, there is provided a method for serializing an object in a server. The method may comprise determining an object to be serialized and determining if a serialization of the object is stored in a serialization cache. When a serialization of the object is stored in the serialization cache, the serialized form of the object is retrieved from the serialization cache.

In one aspect of the disclosure, there is provided a caching server comprising an object cache, a serialization cache, a request handler and a serialization module. The request handler is configured to determine a requirement to provide an object to a client. The serialization module is configured to determine if the object is cached in the object cache. When the object is cached in the object cache, a corresponding serialization of the object is retrieved from the serialization cache and provided to the client.

In one aspect of the disclosure, there is provided a method for serializing an object in a server. The method may comprise determining an object to be serialized and determining if a serialization of the object is stored in a serialization cache. When a serialization of the object is not stored in a serialization cache, the object is serialized, the object is stored in an object cache and the serialized object is stored in the serialization cache.

BRIEF DESCRIPTION OF THE DRAWINGS

Reference will now be made, by way of example only, to specific embodiments and to the accompanying drawings in which.

DETAILED DESCRIPTION OF THE INVENTION

Serialization costs are usually optimized by protocol choice or algorithmically for a given serialization operation and not by avoiding redundant work between serialization requests of all clients. Where the serialization is cached, it is of a complete object graph delivered as an opaque serialization within a serialization. The average practitioner does not consider serialization costs, being usually more focused on optimizing database retrieval logic. In addition, the average practitioner does not have the skills or knowledge to modify the platform serialization and the average practitioner, being more focused on small-scale page-centric web applications, may not encounter the scaling requirement that would drive the necessity for caching optimization. In addition, serialization formats such as the default Java serialization makes caching of the serialized form difficult (except opaquely).

The present embodiments to be described below seek to reduce the burden of serializing an object graph, where one or more members of that object graph remain largely unchanged between serializations (i.e., cacheable), without altering the serialization protocol.

Figure 1:
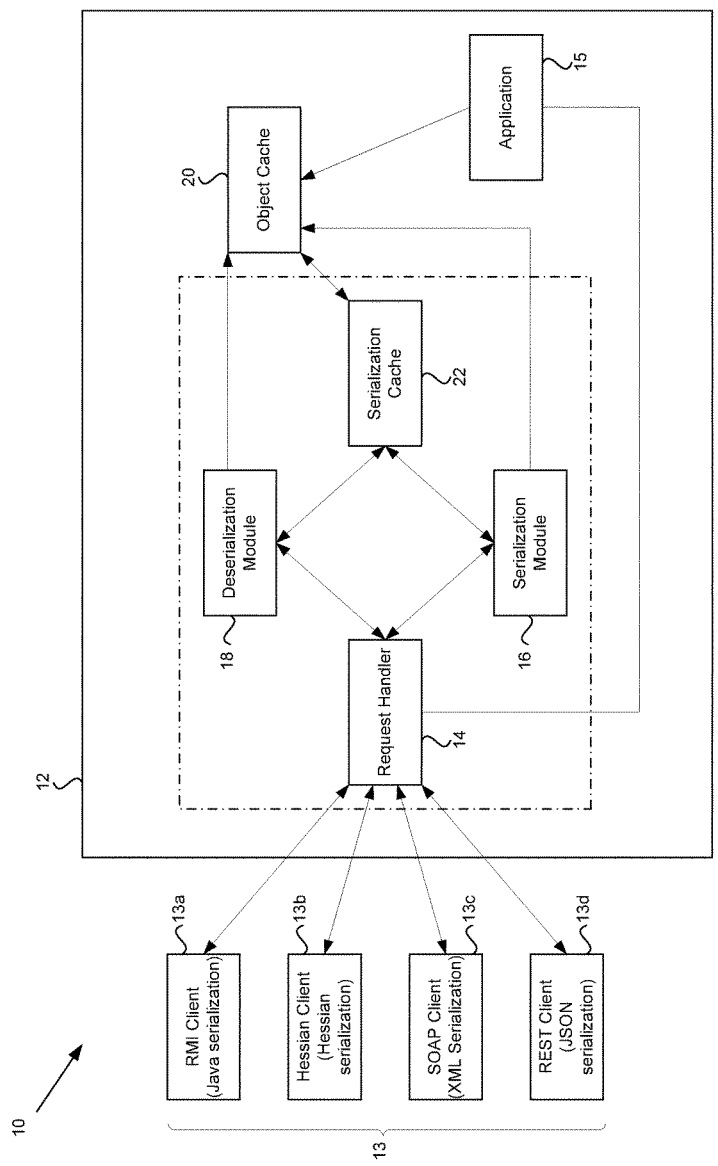
FIG. 1 shows a caching system.

FIG. 1 shows a system in accordance with an embodiment of the present disclosure. In the system 10, a server includes a request handler 14 for handling object requests from clients 13 for an application 15 that is served by the server 12. The server 12 may serve clients 13 on a variety of protocols and by way of example, FIG. 1 shows a Java serialization client 13a, a Hessian serialization client 13b, an XML serialization client 13c and a JSON serialization client 13d. Other serialization protocols may also be utilized. The server 12 includes a serialization module 16 and a deserialization module 18. The serialization module 16 and deserialization module 18 for a serialization protocol are modified or implemented to interact with an object cache 20 and a serialization cache 22 to minimize serialization effort for objects contained within the object cache. The serialization cache 22 may be a separate module, or a sub-module of the object cache 20 with interactions through the object cache. As will be described in more detail below, the serialization cache 22 maintains a serialized form of objects stored in the object cache 20. While a single serialization cache 22 is shown, the object cache 20 may be related to multiple serialization caches (e.g. one per serialization protocol), in the case where the server 12 serves clients with different protocols (e.g., SOAP web services, JSON web services, RMI clients, CORBA clients, etc.). Multiple serialization caches may be maintained as separate entities or as a single entity, i.e. as a single cache.

In serializing an object graph, the serialization module 16 checks if an object to be serialized is contained within the object cache 20. If the object is present in the object cache 20, then the serialization module 16 sets the current serialization context to reference the serialization cache 22 for that object and its referenced or contained objects. If an object is not found in the serialization cache 22, then the serialization module 16 will populate the serialization cache 22 for that object upon serialization of the object.

The process is performed from the top down, starting with the topmost object in the object graph, and is performed for each object contained by the object graph until the object graph is completely serialized. Aspect-oriented programming techniques may be used to keep the serialization cache in sync with the object cache. The serialization cache will only be as consistent (correct) as the object cache. If the access to the serialization cache is via the object cache (or a caching service), then the object cache/caching service could have that responsibility. The present embodiments deal mainly with consistency of the serialization cache with the object cache. There is the assumption that referenced objects of cached objects are cached.

The object cache might be structured such that references to other cached/cacheable objects are via business key/primary key but field values (primitives, immutables or other contained or referenced objects) are stored directly with the cached object.

Removal of an object from the object cache 20 will trigger a symmetric removal from the serialization cache 22. An update to a cached object will invalidate the portion of the serialization cache corresponding to the field(s) updated when the serialization mechanism allows, otherwise the whole of the cached serialization for that object will be removed. For objects shared by cached objects, the serialization cache will be purged only if the last reference is removed subject to normal caching constraints.

The serialization cache 22 contains the byte arrays containing the full or partial serialized form for objects contained by the object cache 20. The serialization cache 22 is particular to a serialization protocol, and an object cache might be related to multiple serialization caches given the application's requirements.

The serialization cache(s) 22 may be populated on additions and updates to the object cache 20, as well as on demand. In this case, the serialization module 22 is invoked to serialize the objects added to the object cache 20, or serialize the fields modified when objects in the object cache 20 are updated (assuming the serialization allows this, otherwise a complete serialization will be performed). The server may use various proxies, interceptors, "decorators", code enhancement or other aspect oriented programming techniques as are known to determine that an object state has been modified.

The cached serialization for an object may be supplied by a client. The typical use case for this would be the addition or update of a referenced object. In this case, the deserialization module 18 would interact with the serialization cache 22 and the object cache 20 to add or replace the cached object and the corresponding serialization data for that object. Another option for a new object is to create a temporary store of the serialized form for that object, which then would be moved into the serialization cache 22 upon later addition of that object to the object cache 20.

In the case where the object cache 20 is distributed among multiple servers, the serialization cache 22 could be used to optimize the transmission of the cached objects between the servers. This is also another case where the deserialization module 18 might be used to supply the serialized form for the serialization cache 22.

Optimizations for the serialization cache 22 include population of the cache (or caches) based on the object cache, prior to a client request for the data and modifying only the portion of the serialization cache (or caches) corresponding to changes to the cached object.

Figure 2:
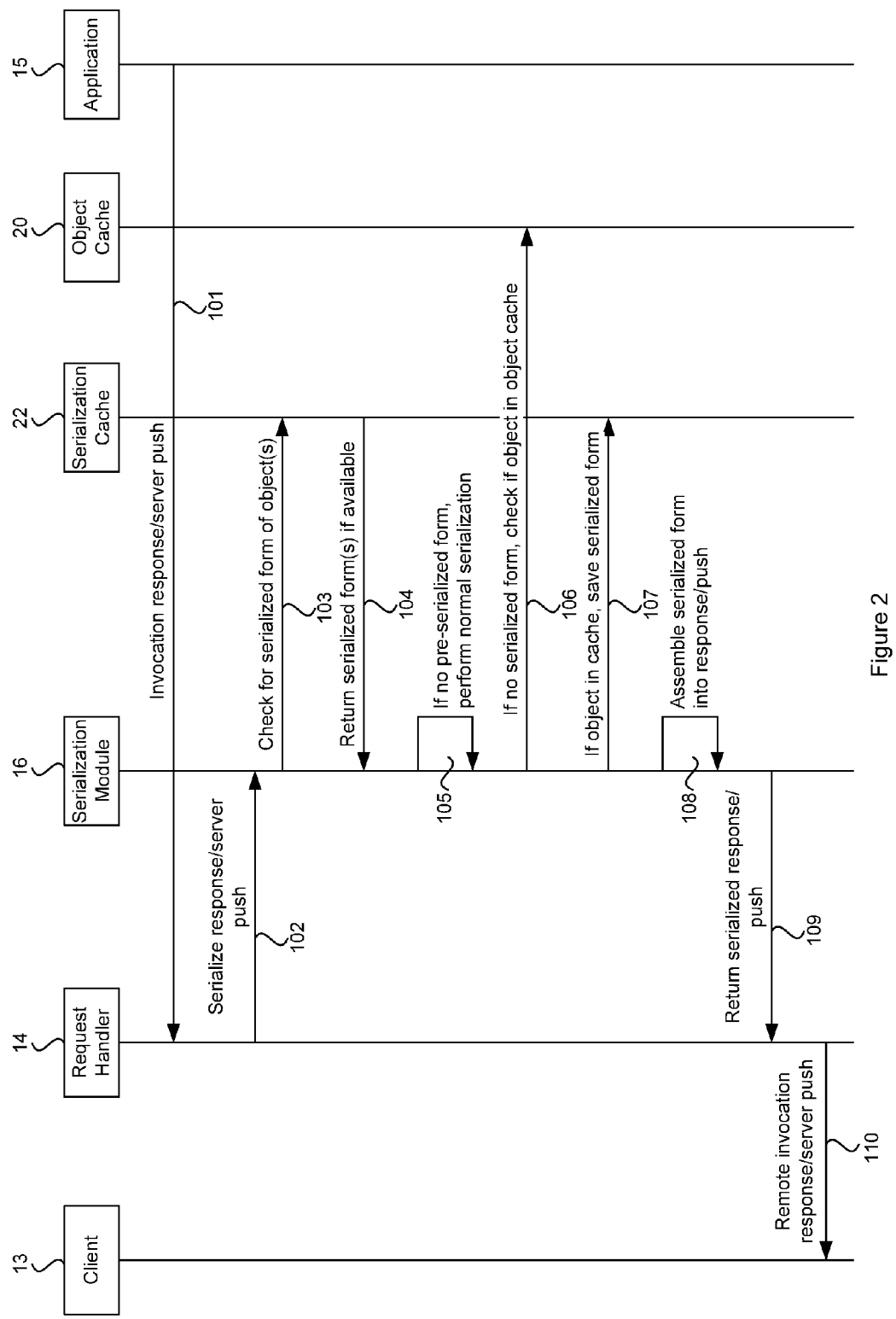
FIG. 2 shows a process for serializing an object to send to a client.

With reference now to FIG. 2, there is shown a process flow for handling an outbound requirement from the server 12 to a client 13. The outbound requirement may be in response to a remote invocation from the client or may be a server side push of an object to the client 13. At step 101, the remote application 15 provides an unserialized object to the request handler 14. The request handler passes the object to the serialization module 16 (step 102) which checks the serialization cache 22 for a serialized form of the object(s) (step 103). The serialization cache 22 returns the serialized objects, if available, at step 104. If no serialized forms of the objects exist within the serialization cache, i.e. a cache miss, then the serialization module serializes the objects as normal (step 105). Once the serialization has been performed, the serialization module 16 checks if the object(s) are present in the object cache 20 (Step 106), and if so, saves the serialized form of the cached object(s) in the serialization cache 22 (step 107). The serialization module 16 assembles the serialized form of the object(s), either as retrieved from the cache and/or as serialized presently by the serialization module 16, into a response/push to the client 13 (step 108). The response/push to the client is provided to the request handler (step 109) and then sent on to the client 13 (step 110).

Figure 3:
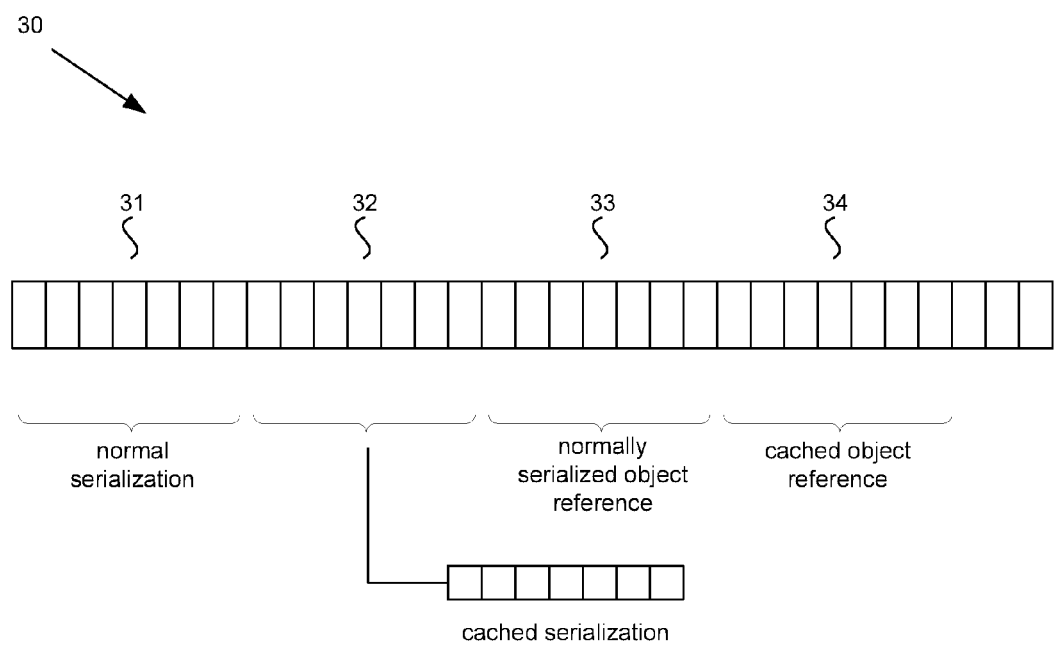
FIG. 3 shows aggregation of a byte stream.

In FIG. 3, there is shown the aggregation of serialized byte stream to be provided to a client. The byte stream 30, which may be only a partial byte stream forming a portion of the entire byte stream to be sent to the client, may include bytes 31 pertaining to a normally serialized object 31, i.e. serialized at the time by the serialization module. The byte stream 30 may also include a serialization of an object 32 retrieved from the serialization cache, an object reference for a normally serialized object 33 and an object reference for a serialized object retrieved from the serialization cache. The byte stream 30 is merely indicative of how different portions of the push to the client can be based on cached and non-cached serializations. An actual byte stream may include some or all of these components. This example shows that the cached serialization is not treated opaquely. A serialized object reference points to a previously (within the byte stream) serialized object.

Figure 4:
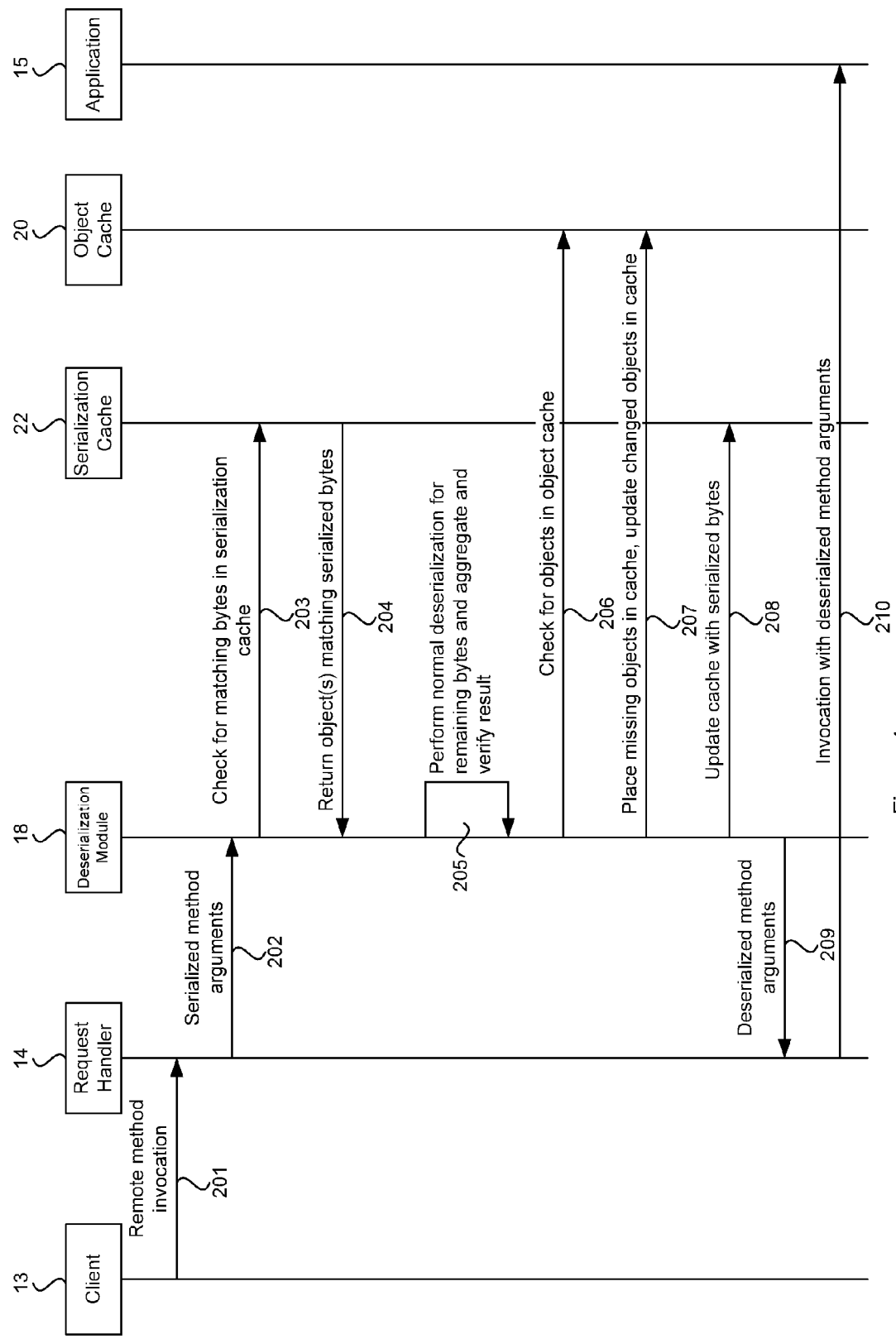
FIG. 4 a process for deserializing an object.

The serialization cache may also be used to improve the performance of deserialization. FIG. 4 shows a process for processing an inbound request. At step 201, a remote method invocation request is provided from a client 13 to the request handler 14. The request handler 14 passes the serialized method arguments (objects) of the request to the deserialization module (step 202). In this case, the deserialization module 18 matches the bytes to be de-serialized with the serialized bytes stored in the serialization cache 22 (steps 203, 204). Through this match, the deserialization module 18 has a reference to the object within the object cache 20, and need not perform (complete) deserialization for that object. A partial deserialization can aid in making a match, as in deserialization of a primary key or other unique identifier for a business object. The deserialization module 18 can then perform a normal deserialization for the remaining bytes, i.e. for the non-cached objects, and aggregate the cached and non-cached objects and verify the result (step 205). At step 206, the deserialization module 18 checks the object cache 20 and places the missing objects in the cache as well as updating any existing cached objects (step 207). Any newly received or updated serialized objects corresponding to the objects added to the object cache are also added to the serialization cache 22 (step 208). The deserialized method arguments are then returned from the deserialization module 18 to the request handler 14 (step 209) to enable the invocation of the method by the application with the deserialized method arguments (step 210).

On deserialization of an object, the server may recognize a "partial match" and update the changed portions in the serialization cache. This may occur, for example, where a client retrieves an object, updates it, and sends it back. For this, the caches for the object and serialization caches would need to be transactional thereby allowing the server to retrieve the cached object, perform deserialization on the cached object for the changed parts, update the cached object, and update the serialization cache for the changed fields.

In some instances, there may be additional complexity if the "immutables" have been in-lined with the primitives. For the deserialization case, this may require two forms being cached: one where in-lined, one where separate.

Figure 5:
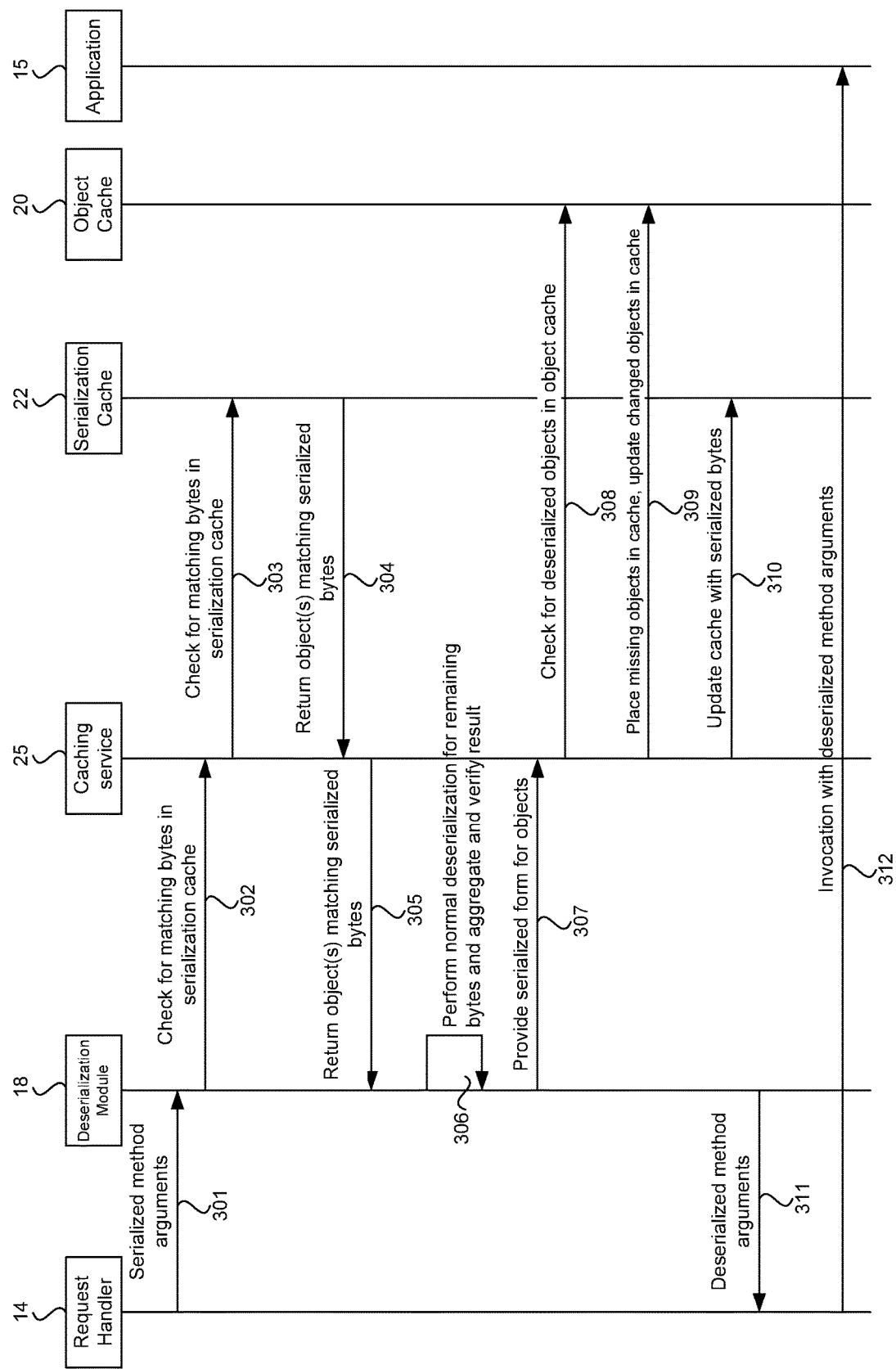
FIG. 5 shows the process of FIG. 4 incorporating a dedicated caching service.

In an alternative embodiment, a dedicated caching service may be utilized for controlling the caching of objects and the serialized forms of objects. The serializing module 16 and deserialization module 18 may pass requests to the caching service for analysis with respect to the object cache 20 and serialization cache 22. By way of example, the inbound request of FIG. 4 is depicted in FIG. 5 with the use of a caching service 25. In this case, when the request handler 14 receives a remote method invocation from a client (not shown), the request handler 14 passes the serialized method arguments to the deserialization module 18 (step 301) which checks for matching cached bytes by sending a request to the caching service 25 (step 302). The caching service 25 retrieves any matching bytes from the serialization cache 22 and returns them to the deserialization module 18 (steps 303, 304, 305). The deserialization module 18 performs deserialization on any non-cached bytes and aggregation as described previously (step 306) and provides the serialized form of the objects to the caching service 25 (step 307) for caching. The caching service 25 then performs the previously described steps of placing missing and updated objects in the object cache 20 and update the serialization cache 22 with the serialized objects (steps 308, 309, 310) while the deserialization module 18 returns the deserialized objects to the request handler 14 (step 311) for invoking the method by the application 15 (step 312).

The caching service provides a programmatic interface. The service implementation could either be local or remote or a combination. In one embodiment, at least part of the implementation is local to the application's machine, if not in the same process as the application. Other embodiments include, without limitation:

1. Local implementation, in-process, in-memory cache (object and serialization);
2. Local implementation, in-process, part in-memory, part in stable storage (object in memory, serialization in stable storage, or both part in memory, part in stable storage);
3. Local implementation, in-process, distributed cache;
4. Local implementation, out-of-process, in-memory-cache;
5. Local implementation, out-of-process, part in-memory, part in stable storage cache;
6. Local implementation, out-of-process, distributed cache.

Remote variants of these embodiments are also conceivable.

It can be seen from the foregoing embodiments that the presently described solution speeds the normal serialization of an object. It also can speed deserialization of an object. These enhancements are for a given protocol and are not modifications to that protocol and thus preserve the correct semantics when interacting with unmodified clients. The client, by supplying the serialized form of an object, may in turn speed the operation of the server in serialization and deserialization of that object.

Idiomatic Java server applications using Hibernate as a persistence mechanism will typically employ a second-level cache for reference entities (business domain objects which remain largely unchanged over the life of the application once defined). Objects maintained within this second level cache are natural candidates for inclusion in a serialization cache 22, since for a given serialization protocol, the cacheable portion of the serialized form of the object will remain unchanged so long as the cached object remains unchanged.

Figure 6:
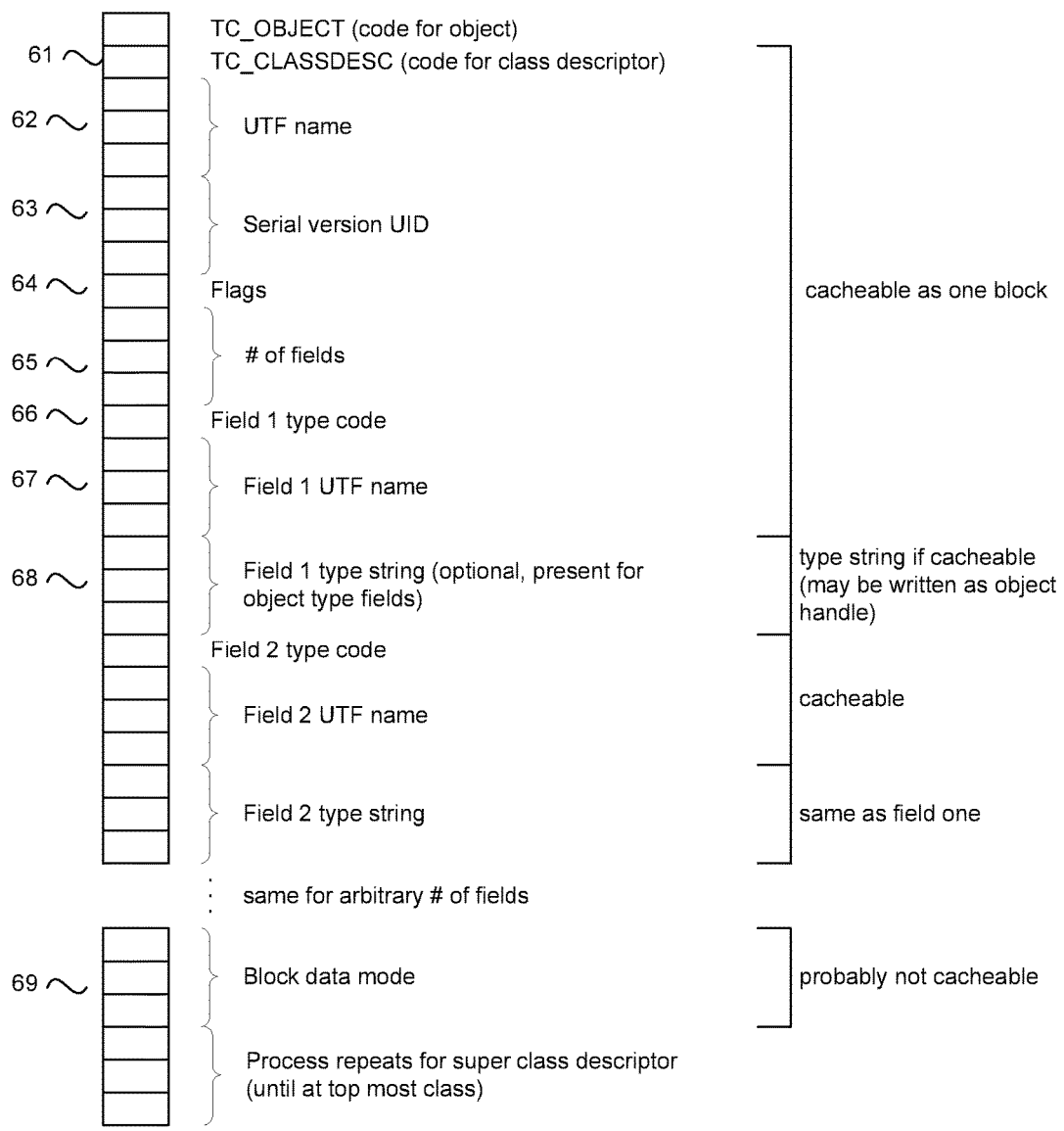
FIG. 6 provides an indication of the cacheable portions of a byte stream.
Figure 7:
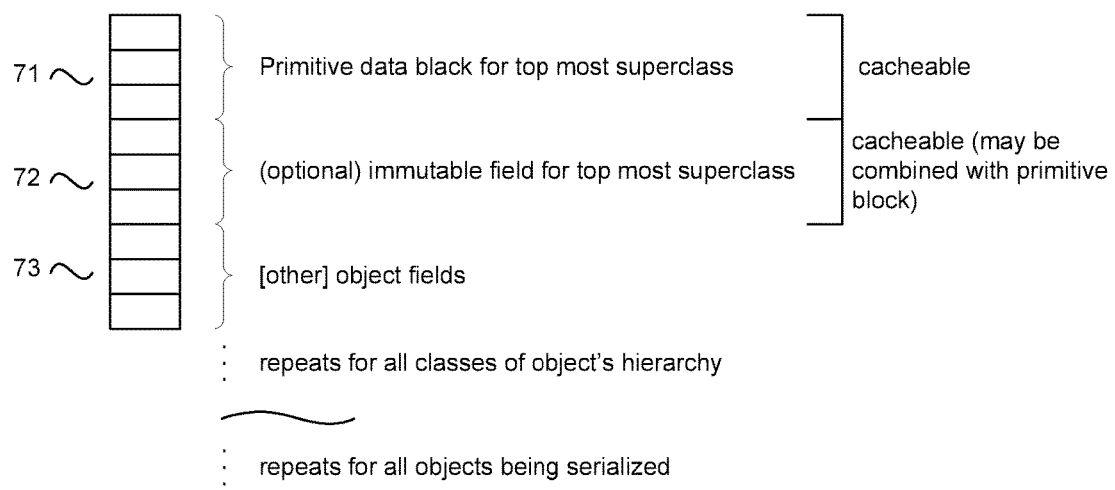
FIG. 7 provides an arrangement of the fields of a byte stream.

Some serialization protocols, like Java object serialization, are not amenable to complete caching when references from the outer scope are considered. FIGS. 6 and 7 detail the portions of the serialized form which are cacheable when using Java serialization. The structure of the serialization cache will differ for each serialization protocol, although some protocols might share the same caching structure.

With reference to FIG. 6, the class descriptor 61, UTF name 62, serial version ID 63, flags 64 and number of fields may be cacheable as a single block. This block may also include the field code 66 and UTF name 67 for the first field. Whether or not the type string 68 of a field is cacheable will depend on the type of field. Similarly, the type code and UTF name for Field 2 and any subsequent fields will be cacheable with the cacheability of the type strings being dependent on the particular field. The block data mode bytes 69 are unlikely to be cacheable because they depend on the total serialization process.

FIG. 7 shows how the fields may be arranged. The fields are arranged first primitives 71, then any immutable fields 72, then other object fields, 73, as shown in FIG. 7. For the Java object serialization protocol, the class descriptor for an object may be altered from the default class descriptor (java.io.ObjectStreamClass) to group primitive "wrapper" objects (e.g., java.lang.Integer) and other immutable value types 72 immediately after the primitive fields 71 to take advantage of the fact that such objects are immutable. If the normal serialization behavior (for Java serialization) to replace duplicate objects with references is ignored, the block of immutable field bytes could be cached and written out following the primitives or cached together with the primitive data block and written as one block. This relaxation of the normal serialization rules and behavior does not require alteration of the deserialization process for the client.

The caching techniques described herein do not modify the "on-the-wire" serialization protocols, only the serialization mechanisms by caching bytes to be directly output to the serialization stream. Importantly, the serialized bytes produced by the described techniques may be interpreted without requiring any modifications at the client side. By contrast, prior art optimization techniques seek to optimize a protocol, or seek to compress the network traffic, which modifies the on the wire format and requires change on the client side, i.e. to decompress. Furthermore, the caching techniques described herein do not prohibit the use of other techniques such as compression, and can be used in conjunction with such techniques as the embodiments deal in the transformation objects to and from uncompressed bytes.

Advantages of the caching of serialized objects includes that it reduces the processing cycles that a server must use to deliver a cached object to a remote client, increasing the ability of the server to handle multiple client requests for cached data. It also does this without altering how the client deserializes the cached object. Fewer CPU cycles may be used to deliver data to a remote client than the typical solutions, and it integrates the cached serialized data within a serialization stream rather than embedding it as a "stream within a stream".

The components of the system may be embodied in hardware, software, firmware or a combination of hardware, software and/or firmware. In a hardware embodiment, the caching server may include one or more processors operatively associated with one or more memories. The memory may store instructions that are executable on the processor for deploying the caching methods described above.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method for serializing an object in a server that serves clients on plurality of serialization protocols comprising:
    determining, by the server, an object to be serialized;
    determining, by the server, a serialization protocol of the plurality of serialization protocols for the object to be serialized;
    determining, by the server, if a serialization of the object of the determined serialization protocol is stored in a serialization cache; and
    when a serialization of the object of the determined serialization protocol is stored in the serialization cache, retrieving, by the server, a serialized form of the object of the determined serialization protocol from the serialization cache;
    wherein, when one or more immutables of the object are in-line with one or more primitives, the serialization cache stores two serializations of the object.

2. The method of claim 1 comprising providing the serialized form of the object retrieved from the serialization cache from the server to a client.

3. The method of claim 1 comprising when the object is not stored in the object cache:
    serializing the object;
    storing the object in the object cache; and
    storing the serialized object in the serialization cache.

4. The method of claim 3 comprising associating the stored serialized object with the corresponding cached object.

5. The method of claim 1 comprising when the object is not stored in the object cache:
    identifying a referenced object contained by the object to be serialized;
    determining if the referenced object is stored in the object cache; and
    when the referenced object is stored in the object cache, retrieving a serialized form of the referenced object from the serialization cache.

6. The method of claim 5 comprising:
    serializing by a serialization module portions of the object to be serialized that cannot be retrieved from the serialization cache; and
    aggregating one or more portion of the object to be serialized that are serialized by the serialization module with one or more portions of the object to be serialized retrieved from the serialization cache.

7. A caching server that serves clients on plurality of serialization protocols comprising:
    at least one processor and at least one operatively associated memory, the at least one processor programmed to provide:
    an object cache;
    a serialization cache;
    a request handler; and
    a serialization module;
    wherein the request handler is configured to determine a requirement to provide an object to a client;
    wherein the serialization module is configured to:
    determine if the object is cached in the object cache;
    when the object is cached in the object cache:
    determining a serialization protocol of the plurality of serialization protocols for the object to be serialized;
    retrieve a corresponding serialization of the object of the determined serialization protocol from the serialization cache; and
    provide the retrieved serialization of the object to the client;
    wherein, when one or more immutables of the object are in-line with one or more primitives, the serialization cache stores two serializations of the object.

8. The server of claim 7 wherein the serialization module is configured to, when the object is not stored in the object cache:
    serialize the object;
    store the object in the object cache; and
    store the serialization of the object in the serialization cache.

9. The server of claim 7 wherein the serialization cache is maintained for a plurality of serialization protocols.

10. The server of claim 7 comprising a plurality of serialization caches for a plurality of serialization protocols.

11. The server of claim 7 comprising a deserialization module, wherein the request handler is configured to receive a remote method invocation request comprising one or more serialized objects from a client and pass the one or more serialized objects to the deserialization module, and wherein the deserialization module is configured to:
reference the serialization cache to determine if one or more of the serialized objects received by the request handle are stored by the serialization cache;
for serialized objects that are stored by the serialization cache, retrieve an object corresponding to the serialized object from the object cache; and
for serialized objects that are not stored by the serialization cache:
deserialize the serialized object;
store the deserialized object in the object cache; and
store the serialized object in the serialization cache.

12. The server of claim 7 wherein the serialization module is configured to, when the object is not stored in the object cache:
identify a referenced object contained by the object to be serialized;
determine if the referenced object is stored in the object cache; and
when the referenced object is stored in the object cache, retrieving a serialized form of the referenced object from the serialization cache.

13. The server of claim 7 wherein the serialization module is configured to:
serialize portions of the object to be serialized that cannot be retrieved from the serialization cache; and
aggregate the portions serialized by the serialization module with portions of the object to be serialized retrieved from the serialization cache.

14. A method for serializing an object in a server that serves clients on plurality of serialization protocols comprising:
determining an object to be serialized;
determining a serialization protocol of the plurality of serialization protocols for the object to be serialized;
determining if a serialization of the object of the determined serialization protocol is stored in a serialization cache; and
when a serialization of the object of the determined serialization protocol is not stored in a serialization cache:
serializing the object for the determined serialization protocol;
storing the object in the object cache; and
storing the serialized object in the serialization cache;
wherein, when one or more immutables of the object are in-line with one or more primitives, the serialization cache stores two serializations of the object.

15. The method of claim 14 comprising associating the stored serialized object with the corresponding cached object.

16. The method of claim 14 comprising:
identifying a referenced object contained by the object to be serialized;
determining if the referenced object is stored in the object cache;
when the referenced object is stored in the object cache, retrieving a serialized form of the referenced object from the serialization cache.

17. The method of claim 16 comprising serializing portions of the object to be serialized that could not be retrieved from the serialization cache.

* * * * *